United States Patent [19]

Hüttner et al.

[11] 3,953,738

[45] Apr. 27, 1976

[54] ARRANGEMENT FOR THE LIGHT-PROJECTION OF INDICIA ONTO AN X-RAY FILM

[75] Inventors: Robert Hüttner; Gerhard Kütterer, both of Erlangen, Germany

[73] Assignee: Siemens Aktiengesellschaft, Erlangen, Germany

[22] Filed: Mar. 6, 1975

[21] Appl. No.: 556,114

[30] Foreign Application Priority Data

Mar. 16, 1974 Germany............................ 2412802

[52] U.S. Cl................................ 250/475; 250/476
[51] Int. Cl.² ........................................ H05G 1/28
[58] Field of Search............................ 250/475, 476

[56] References Cited
UNITED STATES PATENTS 3,703,272  11/1972  Lareau................................ 250/476

*Primary Examiner*—Craig E. Church
*Attorney, Agent, or Firm*—Haseltine, Lake & Waters

[57] ABSTRACT

An arrangement for the light-projection of indicia from a data carrier onto an X-ray film which is located in an X-ray film cassette having a light-sealed closable window, by means of an installation incorporating means for the opening of the window of the X-ray film cassette upon the latter being inserted into the installation, a light source for illuminating the data carrier which is inserted into the installation, an optical device for projecting the data of the data carrier through the opened window of the X-ray film cassette onto the X-ray film located in the X-ray film cassette, and switch means for commencing the light exposure and projection. In the arrangement of the above-mentioned type, a so-called "dove prism" is interposable in the optical beam path of the data being projected through the use of setting means, for the correct non-reversed transillumination or projection of the data for posterior anterior, as well as for anterior posterior exposures.

6 Claims, 3 Drawing Figures

ARRANGEMENT FOR THE LIGHT-PROJECTION OF INDICIA ONTO AN X-RAY FILM

FIELD OF THE INVENTION

The present invention relates to an arrangement for the light-projection of indicia from a data carrier onto an X-ray film which is located in an X-ray film cassette having a light-sealed closable window, by means of an installation incorporating means for the opening of the window of the X-ray film cassette upon the latter being inserted into the installation, a light source for illuminating the data carrier which is inserted into the installation, an optical device for projecting the data of the data carrier through the opened window of the X-ray film cassette onto the X-ray film located in the X-ray film cassette, and switch means for commencing the light exposure and projection.

DISCUSSION OF THE PRIOR ART

An installation is presently known which is utilized for the marking of an X-ray film plate or sheet which is located in a film cassette. For this purpose, there are employed X-ray film cassettes having a light-sealed closable window provided along the edge region of the therein stored X-ray film plate. In the known installation, the window of the inserted X-ray film cassette may be opened with the aid of a pin, which is adapted to be brought into engagement with the window. Additionally, the installation permits the insertion of a data carrier having the patients' data thereon. These data are then light-projected onto the X-ray film sheet located in the cassette by means of a light source and a correspondingly coordinated optical device through the opened window of the cassette. Due to such an installation, the X-ray exposures may be provided with data from the patient from which they emanate while still being in the examination chamber without any great difficulties. This installation, however, is subject to the disadvantage that thereby only those data having been previously marked on the data carrier with reference to the patient can be projected onto the X-ray film, but not such data or information which have been ascertained during the examination and which must be maintained on the X-ray exposure to facilitate the evaluation thereof. Generally, that data must subsequently be manually inscribed on the X-ray film sheet after removal of the latter from the X-ray film cassette. Thereby, mix-ups with all their resultant consequences, cannot be readily avoided.

SUMMARY OF THE INVENTION

Accordingly, it is an object of the present invention to provide a way, in an arrangement of the above-mentioned type, in which the orientation of the exposed film sheet during the evaluation thereof may be determined as simply as possible, and still dependably, independently of whether it relates to p.a. exposures (posterior anterior exposures, or respectively, exposures with the beam direction from the back towards the front of the patient), or a.p. exposures (meaning, anterior posterior exposures).

In an arrangement of the above-mentioned type, a so-called "dove prism" is interposable in the optical beam path of the data being projected through the use of setting means, for the correct non-reversed transillumination or projection for posterior anterior, as well as for anterior posterior exposures. Hereby it becomes possible that the patient data in the installation, meaning, while still in the examination room and prior to the withdrawal of the X-ray films from the X-ray film cassette, may be non-reversely projected onto the X-ray film through the in or out sliding of the "dove prism" with regard to the beam path. In the consideration of the exposed and developed X-ray film sheet, the patient is always viewed from the front, when the patient data are to be read correctly or non-reversed. For this purpose, additional markers which must be fastened to the patient preceding the examination, also become superfluous, as well as subsequent time-consuming inscriptions on the developed film sheet. This type of light-projection or transillumination of the patients' data affords the particular advantage that the operating personnel can immediately recognize the front and rear side of the film sheet which is located in the X-ray film cassette at the cassette cover or at the rear surface of the cassette. Thus, inadvertent mix-ups in the film sides are safely avoided during the data projection. In addition, due to the immediate light-projection of the patients' data in the examination chamber, there are prevented mix-ups among the X-ray film cassettes. Finally, an advantage which must also be considered is that the physician, during the evaluation of the X-ray exposures, always has the patient data correctly and non-reversedly before him and thereby readily readable.

In a suitable embodiment of the invention, the "dove prism" may be electromagnetically interposed in the optical path of the beam. This will assure that the prism is only interposable either completely in or completely out of the beam path, but not merely one-half or partly into the beam path.

In a particularly advantageous further embodiment of the invention, a switch arrangement may be positioned in the insertion path for the X-ray film cassette in the installation, which is controllable by means of the inserting direction of the cassette for the interposition or withdrawal of the "dove prism" from the path of the optical beam. Such an arrangement avoids the need for any auxiliary actuatable switch means for the interposition or withdrawal of the "dove prism", and thereby considerably simplifies the manipulation of the installation.

BRIEF DESCRIPTION OF THE DRAWINGS

Further details of the invention are now described with reference to two preferred embodiments thereof, taken in conjunction with the accompanying drawings; in which.

DETAILED DESCRIPTION

Figure 1:
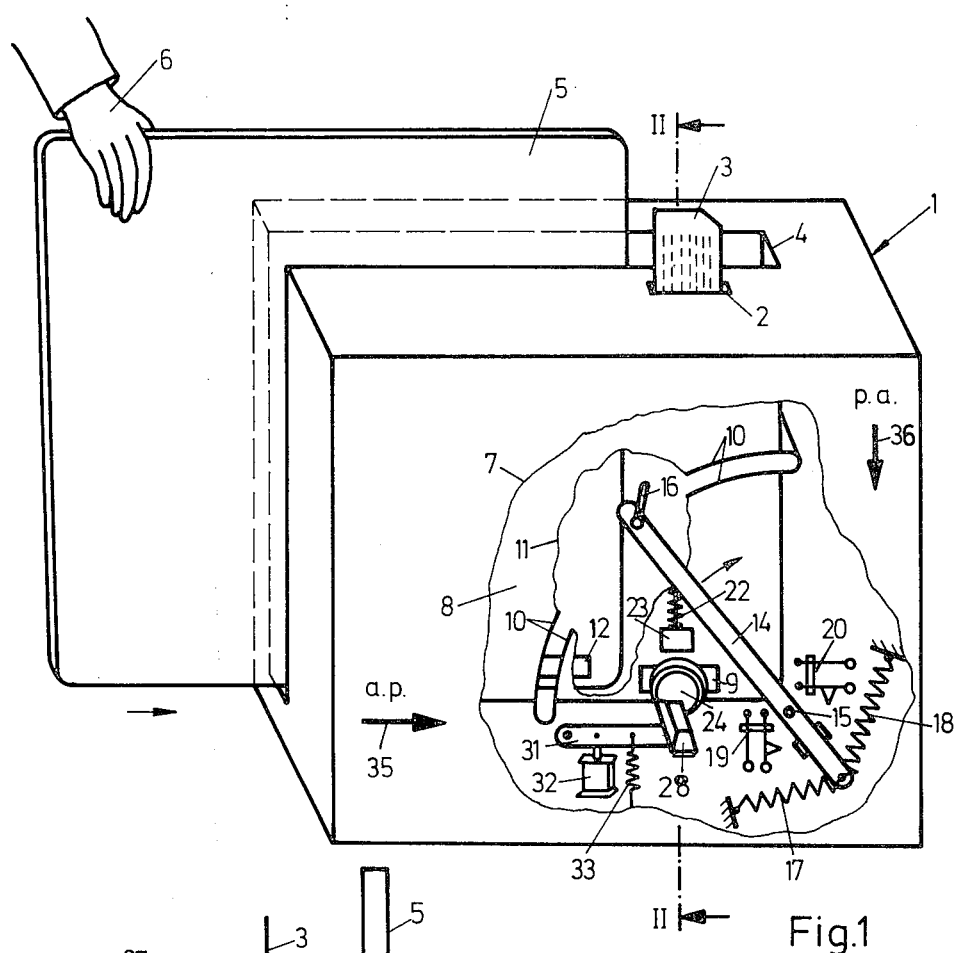
FIG. 1 illustrates a perspective view of an arrangement for the transillumination of a patient's data including an arrangement, shown partly in section, into which the X-ray film cassette is insertable from above and from the side thereof.
Figure 2:
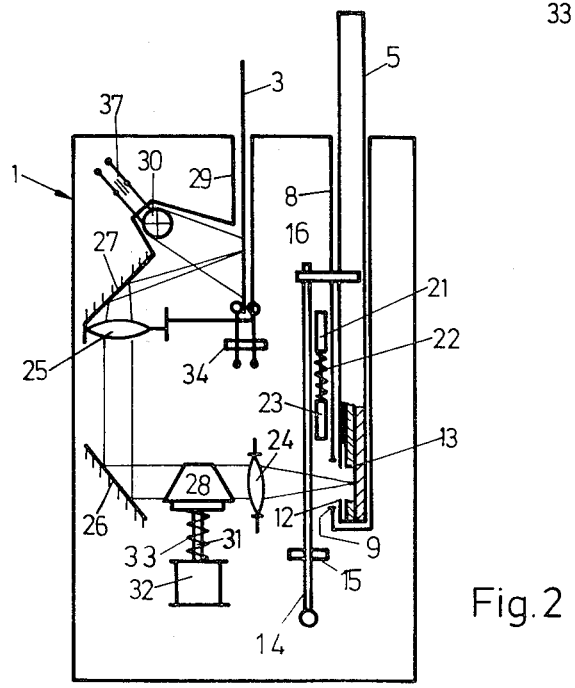
FIG. 2 is a sectional view taken along line II—II in FIG. 1.

Referring now in detail to the drawings, FIGS. 1 and 2 show an arrangement for the transillumination or projection of the patients' data during operation. Provided in the arrangement 1 is a small open insert receptacle 2 for a data carrier 3, and a larger open insert receptacle 4 for an X-ray film cassette 5. The dimensions of the insert receptacles 2, 4 are each coordinated with the thicknees and width of, respectively, the data carrier and the X-ray film cassette. Their depths are so dimensioned that the data carrier, and respectively, the X-ray film cassette, even in their fully inserted positions, still project a few centimeters beyond the arrangement 1. In the illustration of FIG. 1, an X-ray film cassette 5 has just been slid into the insert receptacle 4 by an operator 6. The data carrier 3 which, in the present instance is a patients' punched data card, has already been introduced into the insert receptacle 2. Through a breakthrough 7 shown in the wall of the housing of the arrangement 1, there may be recognized the interior construction of the latter. The inner wall 8 of the insert receptacle 4 for the X-ray film cassette, which faces towards the insert receptacle 2 for the data carrier 3, is provided with a rectangular window 9 and a narrow slit 10 in the form of a quarter circle extending about the inner corner of the insert receptacle 4. Through a wider breakthrough 11 shown in the wall of the insert receptacle 4, there may be recognized the partly inserted X-ray film cassette 5 with its window 12 through which the patients' data may be transilluminated or projected onto the X-ray sheet or plate 13 which is located in the X-ray film cassette. The window 9 in the wall 8 of the insert receptacle 4 of the arrangement 1 lies in aligned superposition with the window 12 of the X-ray film cassette 5 when the latter is fully inserted into the insert receptacle 4 of the arrangement. A feeler rod 16 is fastened to a lever 14, the latter of which is supported so as to be pivotable about an axis 15 which is oriented in perpendicular to the plane of the X-ray film cassette 5 which is slid into the arrangement, and which projects into the slit 10 shaped as a quarter circle in the wall of the insert receptacle 4. The axis of the lever 10 passes through the center point of the quarter circle. The lever 14, which is a two-armed lever, is maintained in an at-rest or equilibrium position by means of two springs 17 an 18 which are fastened in the housing of the arrangement, and which is covered by the angle bisecting inner corner of the inset receptacle 4 for the X-ray film cassette. The arm of the two-armed lever which is remote from the feeler rod 16 has two contact banks 19 and 20 associated therewith, of which each is respectively actuated by the lever 14 at one of the two extreme positions of the latter. Through the window 9 in the inner wall 8 of the insert receptacle, there may be ascertained the permanent magnet 23 which located so as to be displaceable perpendicular to the window aperture through the action of a pull magnet 21 and in opposition to the force of a pressure spring 22, which serves to open the window 12 having a ferro-magnetic coating, of the inserted X-ray film cassette 5. Located opposite the window 9 in the inner wall of the insert receptacle 4 there may be ascertained, in FIG. 1, only a portion of the optical arrangement which is constituted of two lenses 24, 25, two mirrors 26, 27 and a dove prism 28 for the projection onto the X-ray film sheet 13 located in the X-ray film cassette of the patients data provided on the data carrier 3.

A dove prism is a prism which reverts an image but does not produce deviation or displacement of the beam, the rotation of the prism about the axis of the beam rotating the beam at twice the rate of the rotation of the prism.

The construction of the optical installation may best be ascertained from FIG. 2 of the drawings, which shows a section taken along line II—II in FIG. 1. The inner wall 29 of the insert receptacle 2 for the data carrier is shown broken open for illustrative purposes interiorly of the housing of the arrangement 1 on the side of the recorded characters. This side of the data carrier has a flashlight lamp 30 and the mirror 27 associated therewith. Through intermediary of the mirror 27, the image of the illuminated data carrier 3 is projected onto the film sheet 13 in the X-ray film cassette 5 through a lens 25 of a further mirror 26, as well as through the lens 25 of the insert receptacle 4, and through the open window 12 of the X-ray film cassette. The dove prism 28, which is fastened on a pivot lever 31, may in case of need be interposed in the optical beam path between the two lenses 24, 25 by means of a lift magnet 32 acting in opposition to the force of a spring 33. In this instance, the patients' data are projected in a mirror-image manner onto the X-ray film 13. In FIG. 2, there may also be recognized the contact bank 34 which is deactivated by the data carrier upon the insertion of the data carrier 3 into the arrangement 1, and through which there may be controlled the correct position of the data carrier in the insert receptacle 2.

On the outside of the housing arrangement, as may be ascertained from FIG. 1, there are indicated two mutually perpendicular preferred insert directions for the X-ray film cassettes, respectively designated with posterior anterior (p.a.) and anterior posterior (a.p.) and each identified by an arrow 35, 36. When the X-ray film cassette 5 is inserted into the insert receptacle 4, in the manner shown in FIG. 1, in the direction of the arrow 35 designating the anterior posterior (a.p.), then the feeler rod 16 located on lever 14 is taken along by the film cassette towards the right, and the lever 14 thereby in the clockwise direction. In the fully inserted position of the X-ray film cassette, the lever 14 with the end thereof remote from the feeler rod, actuates the left contact bank 17. However, connected to this left contact bank is the lift magnet 1 for the vertical displacement of the permanent magnet 23 and the flashlight lamp 30, the latter of which is connected in parallel to a condenser 37. Thereby, after the full insertion of the X-ray film cassette 5, the window of the inserted X-ray film cassette 5 is opened as a result of the vertical displacement of the permanent magnet 23. Upon illumination of the flashlight lamp 30, which is somewhat delayedly effected through the previous charging of the parallel connected condenser 37, the data which is provided on the patients data cad 3 projects itself onto the X-ray film sheet 13 located in the X-ray film cassette through the window 9 in the wall 8 of the insert receptacle 4, and the now open window 12 of the X-ray film cassette 5. Upon the subsequent withdrawal of the X-ray film cassette, the lever 14 pivots again into its initial and at-rest equilibrium position. Hereby, the contact blank 19 is again opened, the magnet 21 is rendered currentless so that the permanent magnet 23 drops back into its at-rest position, whereupon the window 13 in the X-ray film cassette 5 is again closed. If the film cassette, however, is inserted into the insert receptacle 4 of the arrangement 1, in deviation from the representation of the direction of arrow 36 in FIG. 1 designated as the posterior anterior, then the lever 14 is pivoted in a counterclockwise direction, and the right-hand contact bank 20 actuated. However, connected to this right contact bank 20, in addition to the flashlight lamp 30 and the lift magnet 21 for the permanent magnet 23, there is also connected the lift magnet 32 for the dove prism 28. In distinction with the first mentioned instance, upon the insertion of the X-ray film cassette in the posterior anterior direction, by means of this right-hand contact bank 20 there is also excited the lift magnet for the dove prism 28, so that the dove prism is interposed in the optical beam path or trajectory. In this manner, through the mere insertion of the X-ray film cassette into the insert receptacle of the arrangement, whether it be from the left or from above, without any additional manipulation is determined if the data of the data carrier are to be mirror-image or not to be mirror-image projected onto the X-ray film. Concurrently therewith is also determined the observation side for the X-ray film sheet. If movement is effected in conformance with the direction of the arrow on the outside of the housing of the arrangement, then the diagnosing physician may assume that he is viewing the film sheet 13 in a direction with the patient looking towards him, when he is able to read the patients' data.

Figure 3:
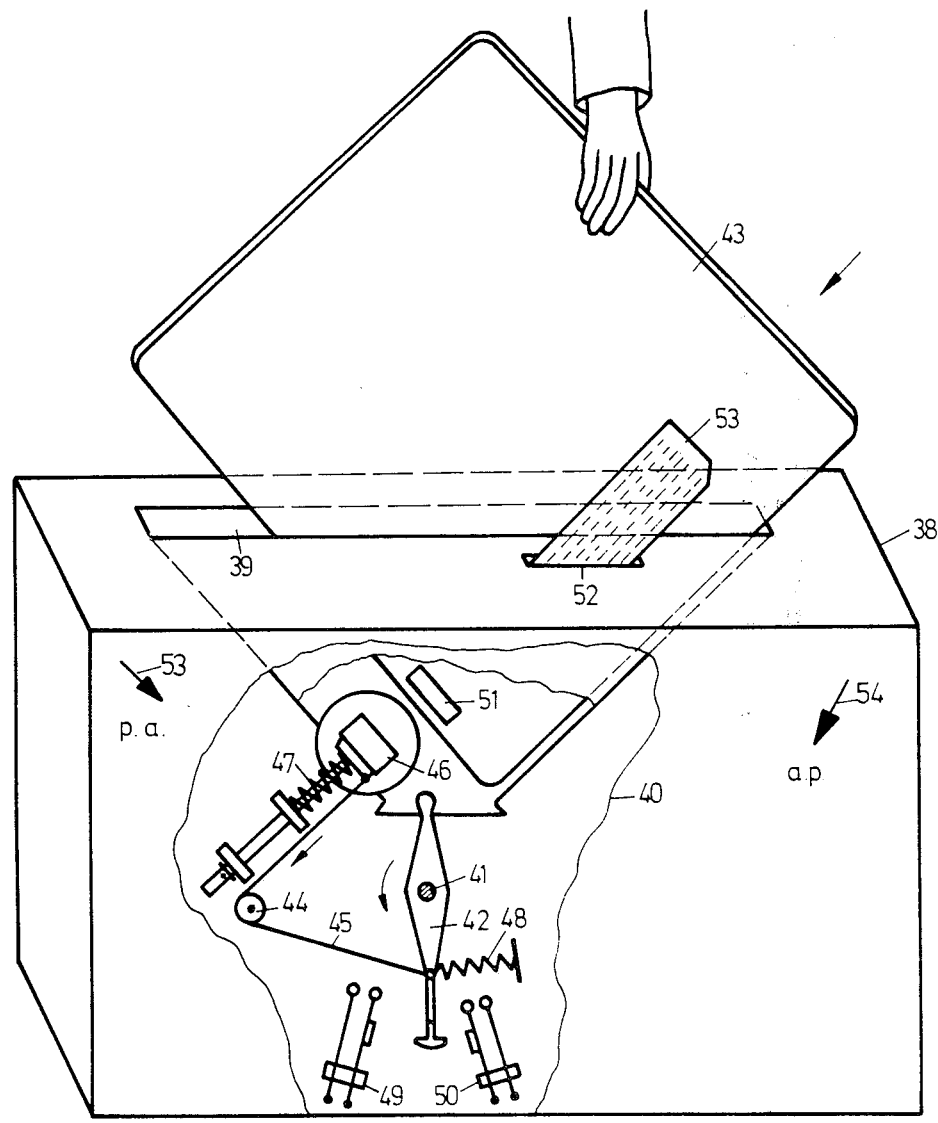
FIG. 3 is a perspective illustration of an arrangement for the transillumination of a patients' data including an arrangement having a mechanically interposable "dove prism".

FIG. 3 illustrates another embodiment of the arrangement 38, in which an insert receptacle 39 for the X-ray film cassette is provided in the top surface of the arrangement in the type of an upwardly widening angle. Through a breakthrough 40 shown in the housing of the arrangement 38, there may be recognized a two-armed lever 42 located in the lower corner of the insert receptacle, which is pivotable about an axis 21 oriented perpendicular to the film plane and which, in a manner to that described with respect to FIG. 1, may be pivoted responsive to the insert direction of the X-ray film cassette 43 in either a clockwise or opposite direction through an angle of about 45°. This lever 42, however, is connected with a dove prism 46 which is movably located in the arrangement, through the intermediary of a reversing roll 44 about which there is entrained a tow line or cable 45. The lever is maintained in an at-rest equilibrium position, by means of a return spring 47 for the dove prism and through a tension spring 48, which conforms to the angle bisector at the inner corner of the insert receptacle 39 for the X-ray film cassette. In this arrangement there are also provided two contact banks 49 and 50 which are actuatable through the lever 42 in the fully inserted position of the X-ray film cassette 43. The two contact banks 49, 50 are connected in parallel with each other. By means of the contact banks, there is actuated a suitable servo motor (not shown) adapted to effect the opening of the window 51 of the introduced X-ray film cassette 43 through a permanent magnet conveyed past the window, and a flashlight source for the illumination of the patients' data on the patient data card 43 which is inserted in the insert receptacle 52 for the patients' card.

When the X-ray film cassette 43 is inserted in the direction of the arrow 54 designating the anterior posterior (a.p.) on the outer side of the housing of the arrangement 33, then the lever 42 is rotated opposite to the clockwise direction by about 45° upon the full insertion of the X-ray film 43. In this position, the dove prism 46 is withdrawn from the beam path in opposition to the force of return spring 47, and the flashlight source and the servo motor for the permanent magnets for opening of the window 51 of the film cassette 42 are actuated through the contact bank 50. Also in this instance are the data of the patients' card, similar to the construction according to FIG. 1, projected on the correct side of the X-ray film sheet located in the X-ray film cassette 43. When the X-ray film cassette 43, however, is inserted in the posterior anterior (p.a.) direction into the insert receptacle 39, then the lever 42 is pivoted by about 45° in the clockwise direction under the force of spring 48. In this instance, the dove prism 46 remains in the beam path so that the patient data, in contrast with the previous case, are projected in a mirror-image manner onto the X-ray film sheet.

It is also possible that the dove prism be interposed in the optical beam path through intermediary of an electro-mechanical drive. In this instance, due to the slow sequence it is, however, suitable that the flashlight source be actuated by means of the same electro-mechanical drive after reaching the new position. Through the use such an electro-mechanical drive there may, concurrently be also moved the permanent magnet, and after the transillumination or projection of the patients' data has been carried out, the X-ray film cassette may also be pressed out of the insert receptacle.

The inventive arrangement, in lieu of a dove housing, may also be built interiorly of an X-ray examination apparatus, for example, an X-ray targeting apparatus. Thereby, the projection of the patients' data may be carried out in the inlet location in the exposure location, or also on the path of movement from the exposure location. The insert receptacle for the patients' card, due to the numerous applicable light path, may be located on the targeting apparatus from a pure manipulative technical viewpoint. The control of the drove prism, in this instance, is suitably carried out by a manually actuatable switch having a neutral equilibrium position, through which the flashlight source may also be actuated.

While there has been shown what is considered to be the preferred embodiment of the invention, it will be obvious that modifications may be made which come within the scope of the disclosure of the specification.

What is claimed is:

1. In an arrangement for the light-projection of indicia from a data carrier onto an X-ray film, including an X-ray film cassette having a light-sealed closable window, said X-ray film being positioned in said film cassette; an installation adapted to have said film cassette and said data carrier inserted therein; means in said installation for opening said window of the inserted film cassette; a light source for illuminating said inserted data carrier; optical means for projecting the illuminated indicia on said data carrier through the open window of said film cassette onto the X-ray film located in said film cassette; and switch means for initiating said illumination, the improvement comprising: a dove prism in said installation; and actuator means for selectively interposing said dove prism in the optical path of said optical projecting means for effecting the non-reversed projection of the data onto said X-ray film for posterior anterior and for anterior posterior exposures.

2. An arrangement as claimed in claim 1, comprising electromagnetic means for interposing said dove prism in the optical path of said optical projecting means.

3. An arrangement as claimed in claim 2, comprising switch means in said installation positioned in the inserting path for said X-ray film cassette, said switch means being controllable responsive to the direction of insertion of said film cassette for effecting, respectively, the interposition or withdrawal from the optical path of said dove prism.

4. An arrangement as claimed in claim 1, comprising an insert receptacle for said X-ray film cassette in said installation having a V-shaped cross-section in the plane of the insertable film cassette; and a lever pivotably supported about an axis which extends perpendicular to the plane of the film cassette, said lever being located at the inner corner of said insert receptacle so as to bisect the angle thereof in its equilibrium position, said lever cooperating with said switch means for controlling the interposition and withdrawal of said dove prism relative to the optical path of said optical projecting means.

5. An arrangement as claimed in claim 1, comprising lever means actuated by said film cassette responsive to insertion of the latter into said installation for interposing said dove prism into the optical path of said optical projecting means.

6. An arrangement as claimed in claim 1, said dove prism being manually interposable in the optical path of said optical projecting means.

\* \* \* \* \*